(12) United States Patent
Kim

(10) Patent No.: US 9,904,387 B2
(45) Date of Patent: Feb. 27, 2018

(54) TOUCH SENSOR INTEGRATED TYPE DISPLAY DEVICE

(71) Applicant: LG DISPLAY CO., LTD, Seoul (KR)

(72) Inventor: Taehwan Kim, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 57 days.

(21) Appl. No.: 14/340,228

(22) Filed: Jul. 24, 2014

(65) Prior Publication Data

US 2015/0029116 A1    Jan. 29, 2015

(30) Foreign Application Priority Data

Jul. 24, 2013    (KR) .......................... 10-2013-0087210

(51) Int. Cl.
*G06F 3/041*        (2006.01)
*G06F 3/045*        (2006.01)

(52) U.S. Cl.
CPC .......... *G06F 3/0412* (2013.01); *G06F 3/0416* (2013.01)

(58) Field of Classification Search
CPC ...... G06F 3/044; G06F 3/0418; G06F 3/0412; H03K 2017/9602; H03K 2217/960755
USPC ................................................. 345/173–174
See application file for complete search history.

(56) References Cited

U.S. PATENT DOCUMENTS

| | | | | |
|---|---|---|---|---|
| 2001/0055004 | A1* | 12/2001 | Gerpheide | G06F 3/0213 345/173 |
| 2008/0180390 | A1* | 7/2008 | Yoshikawa | G06F 3/044 345/156 |
| 2010/0110038 | A1* | 5/2010 | Mo | G06F 3/044 345/174 |
| 2010/0149108 | A1 | 6/2010 | Hotelling et al. | |
| 2012/0075238 | A1* | 3/2012 | Minami | G06F 3/044 345/174 |
| 2012/0080302 | A1 | 4/2012 | Kim et al. | |
| 2012/0086665 | A1* | 4/2012 | Song | G02F 1/13338 345/174 |
| 2012/0194459 | A1 | 8/2012 | Park | |
| 2013/0009894 | A1* | 1/2013 | Wang | G06F 3/041 345/173 |

(Continued)

FOREIGN PATENT DOCUMENTS

| | | |
|---|---|---|
| CN | 102419670 A | 4/2012 |
| CN | 102736291 A | 10/2012 |

(Continued)

*Primary Examiner* — Amit Chatly
(74) *Attorney, Agent, or Firm* — Birch, Stewart, Kolasch & Birch, LLP

(57) ABSTRACT

A touch sensor integrated type display device is discussed. The display device has an active area, and a bezel area disposed at outside of the active area and including a gate driving circuit, the display device comprising a plurality of first electrodes each having the same size, and arranged in the active area in a first direction and a second direction which cross each other; and a plurality of second electrodes arranged in the active area in the second direction and alternately disposed between immediately adjacent pairs of the plurality of first electrodes arranged along the second direction, wherein the plurality of first electrodes include a plurality of first outer electrodes that are disposed at an outermost area of the active area, and at least one of the plurality of first outer electrodes has a portion that is extended into the bezel area.

14 Claims, 6 Drawing Sheets

(56) References Cited

U.S. PATENT DOCUMENTS

2013/0141344 A1* 6/2013 Oh .................... G06F 3/0416
                                                                           345/173

FOREIGN PATENT DOCUMENTS

| CN | 102969456 A | 3/2013 |
|---|---|---|
| JP | 2012-160188 A | 8/2012 |
| KR | 10-2012-0034492 A | 4/2012 |

* cited by examiner

TOUCH SENSOR INTEGRATED TYPE DISPLAY DEVICE

This application claims the benefit of priority under 35 U.S.C. § 119(a) to Korean Patent Application No. 10-2013-0087210 filed on Jul. 24, 2013, which is incorporated by reference herein in its entirety.

BACKGROUND OF THE INVENTION

Field of the Invention

Embodiments of the invention relate to a touch sensor integrated type display device and more particularly a touch sensor integrated type display device capable of improving performance of touch precision at a corner part or edge areas thereof.

Discussion of the Related Art

In recent years, various input devices such as a keyboard, a mouse, a joystick and a digitizer have been used to interface between a user and home appliances or telecommunication devices. However, when a user makes use of the input devices, the user's dissatisfaction may increase because the user is required to learn how to use the input devices and because the input devices occupy space. Therefore, a convenient and simple input device that can reduce erroneous operation is required. According to the requirement, there is proposed a touch sensor that can input information by direct contact of a screen with a user's finger or a pen while seeing the input devices.

The touch sensor has a simple configuration capable of minimizing erroneous operations. Also, the user can perform an input action without using a separate input device, and can quickly and easily manipulate a device through contents displayed on a screen. Accordingly, the touch sensor has been applied to various display devices.

The touch sensor used in the display devices may be classified into an add-on type touch sensor, an on-cell type touch sensor and an integrated type (which is also called an in-cell type) touch sensor. The add-on type touch sensor is configured such that a display device and a touch sensor are individually and/or separately manufactured, and then the touch sensor is attached to an upper substrate or an upper portion of the display device. The on-cell type touch sensor is configured such that components constituting a touch sensor are directly formed on the surface of an upper portion of the display device, such as an upper glass substrate. The integrated type touch sensor is configured such that a touch sensor is integrated into a display device to make it a thin shape and enhance durability thereof.

The add-on type touch sensor causes the thickness of a display device to increase because the add-on type touch sensor has a structure in which the add-on type touch sensor is mounted on the display device. Further, visibility of the display device is reduced because of a reduction in a brightness of the display device resulting from the increased thickness.

On the other hand, the on-cell type touch sensor shares the glass substrate with the display device because the on-cell type touch sensor has the structure in which the on-cell type touch sensor is formed on the surface of the glass substrate of the display device. Therefore, a thickness of the display device using the on-cell type touch sensor is less than a thickness of the display device using the add-on type touch sensor. However, the entire thickness of the display device implementing the on-cell type touch sensor increases because of use of a touch driving electrode layer, a touch sensing electrode layer, and an insulating layer for insulating the touch driving electrode layer and the touch sensing electrode layer which constitute the on-cell type touch sensor.

Accordingly, the embodiments of the invention are focused on the integrated type touch sensor in that it is possible to achieve a thin shape of the display device and enhance a durability of the display device, thereby resolving the problems of the add-on type and on-cell type touch sensors.

Hereinafter, a related art a touch sensor integrated type display device will be described with reference to FIG. 1. FIG. 1 is a top plan view illustrating a related art touch sensor integrated type display device.

Referring to FIG. 1, the touch sensor integrated type display device includes an active area AA displaying data and a bezel area BA disposed at outside of the active area AA. The active area includes touch electrodes formed therein, and the bezel area BA includes wires and a gate driving circuit formed therein.

More specifically, the active area AA includes a plurality of first touch electrodes Tx11 to Tx14, Tx21 to Tx24, Tx31 to Tx34 and Tx41 to Tx44, a plurality of first sub-routing wires TW11 to TW14, TW21 to TW24, TW31 to TW34, and TW41 to TW44, and a plurality of second touch electrodes Rx1 to Rx3. The plurality of first touch electrodes Tx11 to Tx14, Tx21 to Tx24, Tx31 to Tx34 and Tx41 to Tx44 are divided in a first direction (e.g., x-axis direction) and second direction (e.g., y-axis direction) which are cross to each other. The plurality of first sub-routing wires TW11 to TW14, TW21 to TW24, TW31 to TW34, and TW41 to TW44 are connected to the plurality of first touch electrodes Tx11 to Tx14, Tx21 to Tx24, Tx31 to Tx34 and Tx41 to Tx44, respectively and arranged in the second direction. Each of the plurality of second touch electrodes Rx1 to Rx3 is disposed between first touch electrodes Tx11 to tx41 and Tx12 to Tx42, Tx12 to Tx42 and Tx13 to Tx43, Tx13 to Tx43 and Tx14 to Tx44 neighbored in the first direction.

The plurality of first touch electrodes Tx11 to Tx14, Tx21 to Tx24, Tx31 to Tx34 and Tx41 to Tx44 are connected to the first connection wires TW1c to TW4c, and a plurality of first main-routing wires TW1 to TW4 through the first sub-routing wires TW11 to TW14, TW21 to TW24, TW31 to TW34, thereby forming a plurality of first touch electrode serials Tx1 to Tx4 arranged in the first direction in the active area AA.

More specifically, 1-1 touch electrodes Tx11 to Tx14 arranged in a first row are connected to each other by the 1-1 sub-routing wires TW11 to TW14 which are connected to the 1-1 touch electrodes Tx11 to Tx14, respectively, a 1-1 connection wire TW1c which connects the 1-1 sub-routing wires TW11 to TW14, and a 1-1 main-routing wire TW1 connected to the 1-1 connection wire TW1c, thereby forming a 1-1 touch electrode serial Tx1.

1-2 touch electrodes Tx21 to Tx24 arranged in a second row are connected to each other by the 1-2 sub-routing wires TW21 to TW24 which are connected to the 1-2 touch electrodes Tx21 to Tx24, respectively, a 1-2 connection wire TW2c which connects 1-2 sub-routing wires TW21 to TW24, and a 1-2 main-routing wire TW2 connected to the 1-2 connection wire TW2c, thereby forming a 1-2 touch electrode serial Tx2.

1-3 touch electrodes Tx31 to Tx34 arranged in a third row are connected to each other by the 1-3 sub-routing wires TW31 to TW34 which are connected to the 1-3 touch electrodes Tx31 to Tx34, respectively, a 1-3 connection wire TW3c which connects 1-3 sub-routing wires TW31 to TW34, and a 1-3 main-routing wire TW3 connected to the 1-3 connection wire TW3c, thereby forming a 1-3 touch electrode serial Tx3.

1-4 touch electrodes Tx41 to Tx44 arranged in a fourth row are connected to each other by the 1-4 sub-routing wires TW41 to TW44 which are connected to the 1-4 touch electrodes Tx41 to Tx44, respectively, a 1-4 connection wire TW4c which connects 1-4 sub-routing wires TW41 to TW44, and a 1-4 main-routing wire TW4 connected to the 1-4 connection wire TW4c, thereby forming a 1-4 touch electrode serial Tx4.

A 2-1 touch electrode Rx1 of the plurality of second electrodes Rx1 to Rx3 is disposed between 1-5 touch electrodes Tx11 to Tx41 arranged in a first column and 1-6 touch electrodes Tx12 to Tx42 arranged in a second column, thereby forming a 2-1 touch electrode serial Rx1.

A 2-2 touch electrode Rx2 of the plurality of second electrodes Rx1 to Rx3 is disposed between 1-6 touch electrodes Tx12 to Tx42 arranged in a second column and 1-7 touch electrodes Tx13 to Tx43 arranged in a third column, thereby forming a 2-3 touch electrode serial Rx3.

A 2-3 touch electrode Rx3 of the plurality of second electrodes Rx1 to Rx3 is disposed between 1-7 touch electrodes Tx13 to Tx43 arranged in a third column and 1-8 touch electrodes Tx14 to Tx44 arranged in a fourth column, thereby forming a 2-4 touch electrode serial Rx4.

The bezel area BA is disposed at outside of the active area AA, and includes a gate driving circuit GD and wires. The gate driving circuit GD is formed in a gate in panel (GIP) type in the bezel area BA to drive gate lines of the display device. The wires include the touch wires TW11 to TW14, TW21 to TW24, TW31 to TW34, TW41 to TW44, TW1c to TW4c, TW1 to TW4 and RW1 to RW3 connected to the first and second touch electrodes Tx11 to Tx14, Tx21 to Tx24, Tx31 to Tx34, Tx41 to Tx44 and Rx1 to Rx3, gate lines connected to the gate driving circuit GD, and data lines connected to a data driving circuit.

The first and second touch electrodes Tx11 to Tx14, Tx21 to Tx24, Tx31 to Tx34, Tx41 to Tx44, and Rx1 to Rx3 are formed by dividing a common electrode of the display device. Accordingly, the first and second touch electrodes Tx11 to Tx14, Tx21 to Tx24, Tx31 to Tx34, Tx41 to Tx44, and Rx1 to Rx3 are operated as the common electrode in a display mode and operated as touch electrodes for perceiving touch positions in a touch mode.

If fingers or conductive material such as a stylus pen approaches or touches (hereinafter, referred to as "touch") to the active area AA of the related touch sensor integrated type display device, it perceives a change of capacitance between the first and second touch electrodes near to a touch position and finds the touch position.

Hereinafter, a touch precision for perceiving touch positions according to touch positions will be described with reference to FIG. 2. FIG. 2 is a top plan view illustrating touch positions of the related art touch sensor integrated type display device to explain a difference of touch accuracy according to the touch positions.

The related art touch sensor integrated type display device shown in FIG. 1 includes the first and second touch electrodes Tx11 to Tx14, Tx21 to Tx24, Tx31 to Tx34, Tx41 to Tx44, and Rx1 to Rx3 formed by dividing a common electrode in the active area AA. The magnitude of mutual capacitance between the first and second touch electrodes Tx11 to Tx14, Tx21 to Tx24, Tx31 to Tx34, Tx41 to Tx44, and Rx1 to Rx3 is different according to touch positions. That is, the magnitude of mutual capacitance at edges or corners of the active area AA is less than that of the middle portion of the active area AA. Accordingly, after the touch, a change amount of mutual capacitance at edges or corners of the active area AA is also less than that of the middle portion of the active area AA Referring to FIG. 2, the change mount of mutual capacitance according to the touch positions 1 to 4 will be described. If a touch is performed at the touch position 1, the change mount of mutual capacitance between the 1-3 touch electrode Tx13 and the 2-2 touch electrode Rx2 and the change mount of mutual capacitance between the 1-3 touch electrode Tx13 and the 2-3 touch electrode Rx3 are accumulated to calculate the total change amount of the mutual capacitance before and after the touch is performed.

If a touch is performed at the touch position 2, the change mount of mutual capacitance between the 1-3 touch electrode Tx13 and the 2-3 touch electrode Rx3 and the change mount of mutual capacitance between the 1-4 touch electrode Tx14 and the 2-3 touch electrode Rx3 are accumulated to calculate the total change amount of the mutual capacitance before and after the touch is performed.

If a touch is performed at the touch position 3, the change mount of mutual capacitance between the 1-4 touch electrode Tx14 and the 2-3 touch electrode Rx3 is calculated to obtain the total change amount of the mutual capacitance before and after the touch is performed.

If a touch is performed at the touch position 4, the change mount of mutual capacitance between the 1-4 touch electrode Tx14 and the 2-3 touch electrode Rx3 is calculated to obtain the total change amount of the mutual capacitance before and after the touch is performed. The change mount of mutual capacitance at the touch position 4 is less than that at the touch position 3 because the touch is performed on a corner of the 1-4 touch electrode Tx14 at the touch position 4 and the touch area at the touch position 4 is smaller than that at the touch position 3.

From the comparison of the change mounts of mutual capacitances at the touch positions 1 to 4, it is known that the change mounts of mutual capacitances at the touch positions 1 and 3 are similar to each other, the change mount of mutual capacitance at the touch position 3 is less than that at the touch position 1 or 2, and the change mount of mutual capacitance at the touch position 4 is less than that at the touch position 3.

As thus, the change amounts of the mutual capacitances at corner areas and edge areas are less than that at center area because the change amounts of mutual capacitances are different according to the touch positions. There are some problems in that touch accuracy and linearity at edge areas and corner areas of the active area AA are deteriorated.

Accordingly, it is required to prevent the touch accuracy and linearity from being deteriorated though touches are performed at edge areas and corner areas of the active area AA of the touch sensor integrated type display device.

SUMMARY OF THE INVENTION

Embodiments of the invention provide a touch sensor integrated type display device, which may prevent a touch accuracy and linearity from being deteriorated though touches are performed at edge areas and corner areas of an active area of a touch sensor integrated type display device.

In one aspect, there is a touch sensor integrated type display device having an active area, and a bezel area disposed at outside of the active area and including a gate driving circuit, the display device comprising a plurality of first electrodes each having the same size, and arranged in the active area in a first direction and a second direction which cross each other; and a plurality of second electrodes arranged in the active area in the second direction and alternately disposed between immediately adjacent pairs of the plurality of first electrodes arranged along the second direction, wherein the plurality of first electrodes include a plurality of first outer electrodes that are disposed at an outermost area of the active area, and at least one of the plurality of first outer electrodes has a portion that is extended into the bezel area.

The display device has at least one of the plurality of second electrodes having a portion that is extended into the bezel area.

The display device has the plurality of first outer electrodes including a plurality of first corner electrodes disposed at corner areas of the active area, and each of the plurality of first corner electrodes has portions that are extended into the bezel area along the first and second directions, and each of the plurality of second electrodes has a portion that is extended into the bezel area along the second direction.

The display device has the plurality of first outer electrodes including a plurality of first edge electrodes disposed at upper and lower edge areas of the active area, and each of the plurality of first edge electrodes has a portion that is extended into the bezel area along the second direction, and the plurality of first outer electrodes include a plurality of second edge electrodes disposed at left and right edge areas of the active area, and each of the plurality of second edge electrodes has a portion that is extended into the bezel area along the first direction.

The display device has at least one of the plurality of first edge electrodes and the plurality of second edge electrodes being overlapped with the gate driving circuit.

The display device further includes a plurality of first sub-routing wires respectively connected to the plurality of first touch electrodes, and arranged in the second direction to be extended into the bezel area; first connection wires respectively connected to the plurality of sub-routing wires in the bezel area to form a plurality of first electrode serials extending in the first direction; and a plurality of second sub-routing wires respectively connected to the plurality of second electrodes in the bezel area.

The display device further includes at least one third electrode disposed at at least one region of the bezel area, and arranged in parallel with the plurality of second electrodes arranged in the second direction to be neighbored to the plurality of first edge electrodes or the plurality of second edge electrodes.

The display device has each of the plurality of first edge electrodes disposed at upper and lower edge areas of the active area among the plurality of first outer electrodes being extended into the bezel area along the second direction, and each of the plurality of second electrodes is extended into the bezel area along the second direction.

The display device has the at least one third electrode being overlapped with the gate driving circuit.

The display device further includes at least one resistance reducing wire connected to the at least one third electrode to reduce a resistance of the at least one third electrode.

The display device as the at least one resistance reducing wire being formed on a transparent electrode of the gate driving circuit, and the at least one third electrode is connected to the at least one resistance reducing wire via a contact hole formed in a passivation layer covering the transparent electrode and the at least one resistance reducing wire.

In another aspect, a touch sensor integrated type display device has an active area and a bezel area, the bezel area being disposed on peripheries of the active area, whereby the display device includes a plurality of first electrodes each having the same size, and arranged in a first direction and a second direction which cross each other; a plurality of second electrodes arranged in the active area in the second direction and alternately disposed between immediately adjacent pairs of the plurality of first electrodes arranged along the second direction; and a gate driving circuit; wherein the plurality of the first electrodes and the plurality of second electrodes are arranged to define a rectangular configuration of the active area, and the bezel area is disposed at the periphery of the active area, wherein the plurality of first electrodes include a plurality of first outer electrodes that are disposed at an outermost area of the active area, and the plurality of first outer electrodes each has a portion that is extended into the bezel area, wherein the plurality of second electrodes each has opposite ends that are extended into the bezel area, and the gate driving circuit is entire disposed in the bezel area.

The display device has at least one of the plurality of first outer electrodes and the plurality of second edge electrodes being overlapped with the gate driving circuit in the bezel area.

The display device has the portions of the at least one of the plurality of first outer electrodes and the plurality of second edge electrodes that extends into the bezel area being overlapped with the gate driving circuit According to embodiments of the invention, it is possible to increase the change amount of a mutual capacitance between the first touch electrodes disposed at outermost of the active area and the second touch electrodes though touches are performed at edge areas and corner areas of the active area of the touch sensor integrated type display device because the first touch electrodes disposed at outermost of the active area and the both ends of the second touch electrodes are extended to the bezel area. Also, it is possible to increase the change amount of a mutual capacitance between the first touch electrodes and the second touch electrodes though touches are performed at edge areas and corner areas of the active area of the touch sensor integrated type display device, because second touch electrodes for sensing the touches are disposed to be overlapped with the gate driving circuit having a GIP type in the bezel area. Accordingly, it is possible to prevent touch accuracy and linearity from being deteriorated though touches are performed at edge areas and corner areas of the active area AA of the touch sensor integrated type display device.

BRIEF DESCRIPTION OF THE DRAWINGS

The accompanying drawings, which are included to provide a further understanding of the invention and are incorporated into and constitute a part of this specification, illustrate embodiments of the invention and together with the description serve to explain the principles of the invention. In the drawings.

DETAILED DESCRIPTION OF THE EMBODIMENTS

Figure 1:
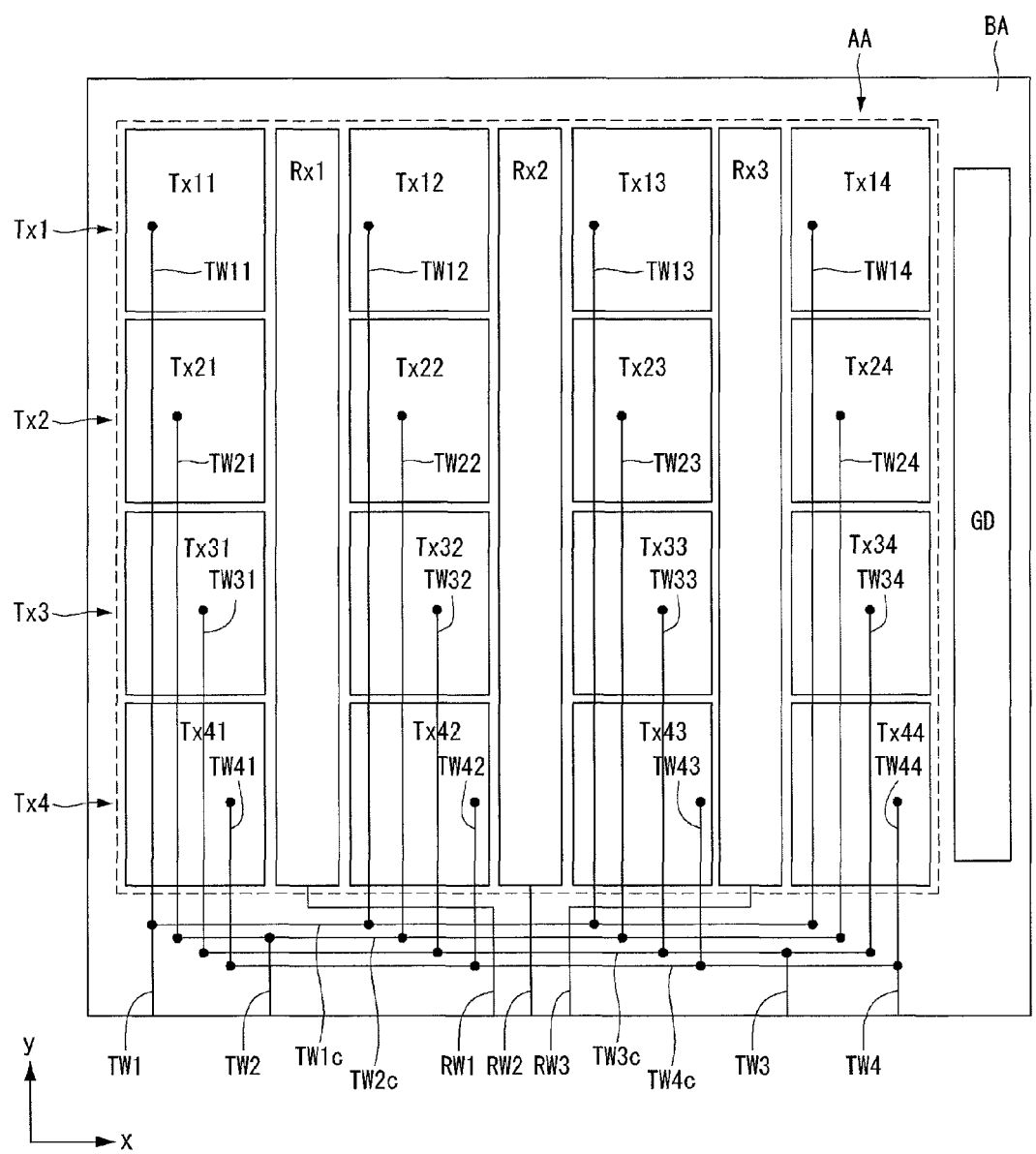
FIG. 1 is a top plan view illustrating a related art touch sensor integrated type display device.
Figure 2:
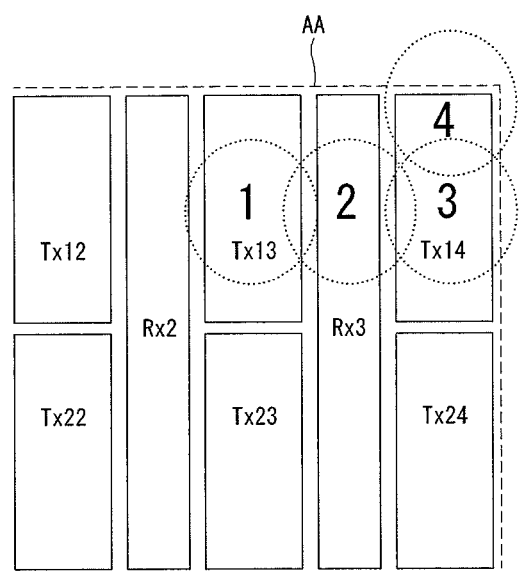
FIG. 2 is a top plan view illustrating touch positions of the related art touch sensor integrated type display device to explain a difference of touch accuracy according to the touch positions.

Hereinafter, example embodiments of the invention will be described in detail with reference to the accompanying drawings, wherein same reference numerals may be used to denote the same or substantially the same elements throughout the specification and the drawings. In the following description, a touch sensor integrated type liquid crystal display (LCD) device is used as an example of the touch sensor integrated type display device. However, another type display devices are contemplated within the scope of the present disclosure.

Figure 3:
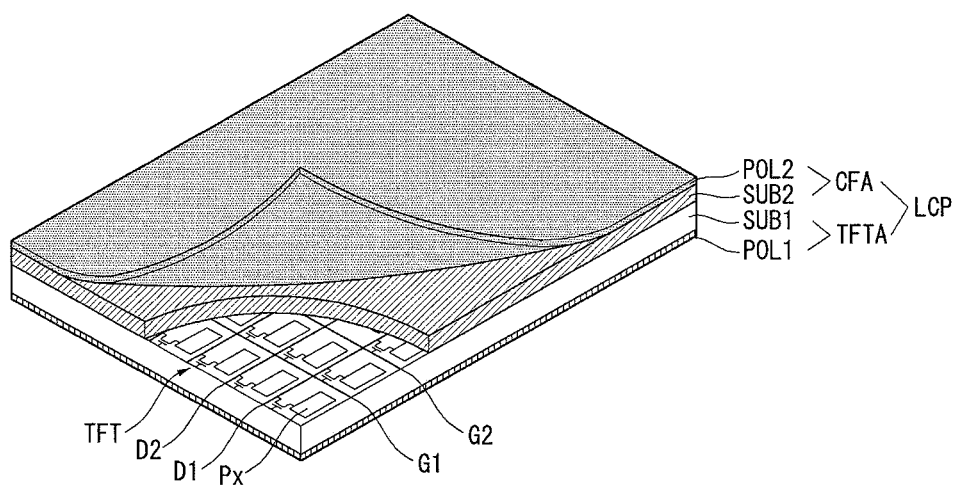
FIG. 3 is a partial exploded perspective view schematically illustrating a touch sensor integrated type display device according to embodiments of the invention.
Figure 4:
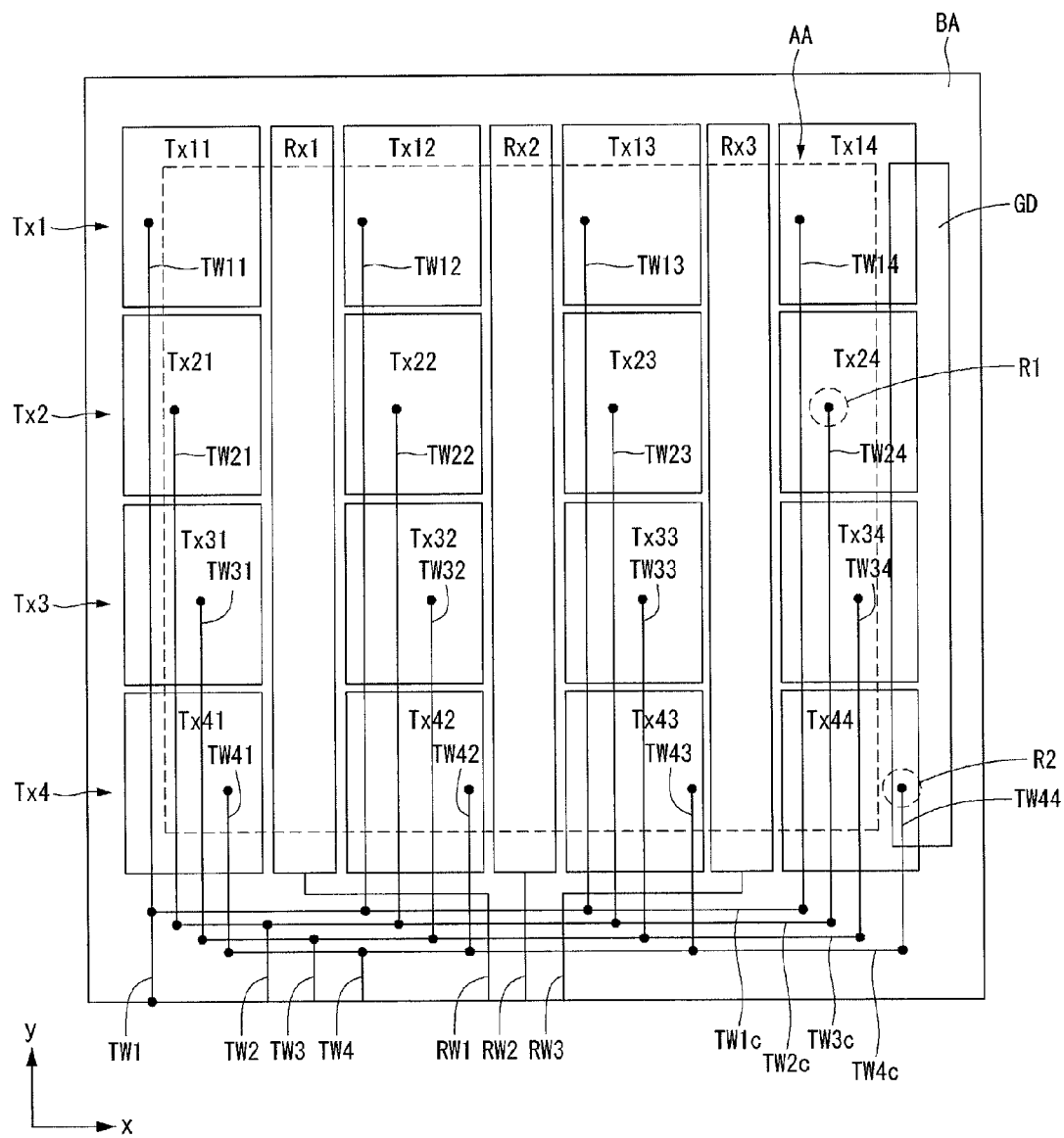
FIG. 4 is a top plan view illustrating a touch sensor integrated type display device according to an embodiment of the invention.
Figure 5A:
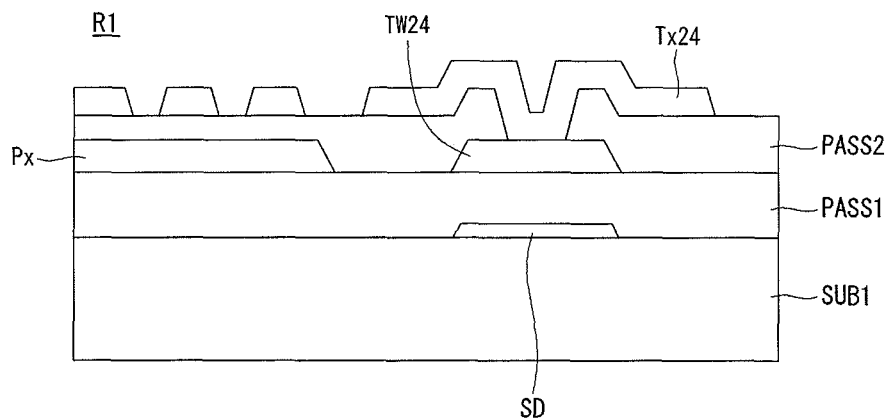
FIG. 5A is a cross-sectional view of region R1 shown in FIG. 4.
Figure 5B:
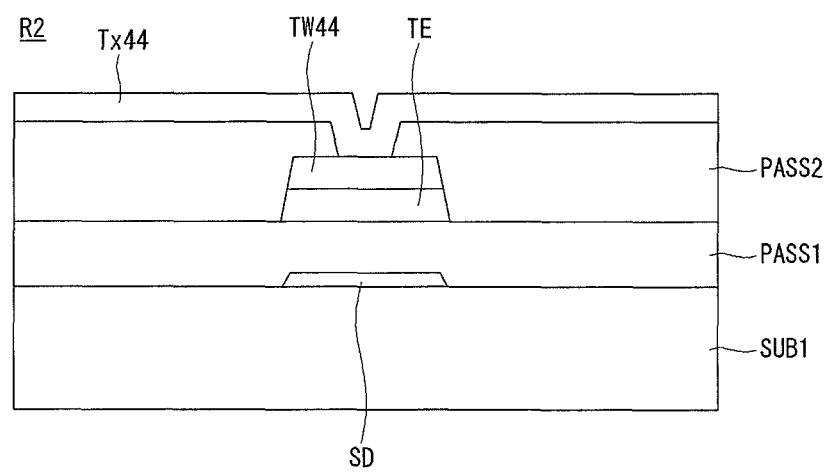
FIG. 5B is a cross-sectional view of region R2 shown in FIG. 4.

A touch sensor integrated type display device according to an example embodiment of the invention is described in detail with reference to FIGS. 3, 4, 5A and 5B. FIG. 3 is a partial exploded perspective view schematically illustrating a touch sensor integrated type display device according to embodiments of the invention, FIG. 4 is a top plan view illustrating a touch sensor integrated type display device according to an embodiment of the invention, FIG. 5A is a cross-sectional view of region R1 shown in FIG. 4, and FIG. 5B is a cross-sectional view of region R2 shown in FIG. 4.

Referring FIG. 3, the touch sensor integrated type display device according to one embodiment of the invention includes a liquid crystal display panel LCP having a color filter array CFA and a thin film transistor (TFT) array TFTA with a liquid crystal layer interposed therebetween.

The TFT array TFTA includes a plurality of gate lines G1 and G2 which are formed in parallel on a first substrate SUB1 in a first direction (for example, x-axis direction), a plurality of data lines D1 and D2 which are formed in parallel in a second direction (for example, y-axis direction) to cross over the plurality of gate lines G1 and G2, crystal liquid cells disposed at areas defined by the crossings of the gate lines G1 and G2 and the data lines D1 and D2, thin film transistors TFT formed at crossings of the gate lines G1 and G2 and the data lines D1 and D2, a plurality of pixel electrodes Px for charging the liquid crystal cells with a data voltage, and a plurality of common electrodes positioned opposite the plurality of pixel electrodes Px.

The color filter array CFA includes black matrixes and color filters, which are formed on a second substrate SUB2. Polarizing plates POL1 and POL2 are respectively attached to outer surfaces of the first substrate SUB1 and the second substrate SUB2 of the liquid crystal display panel LCP. Alignment layers for setting a pre-tilt angle of liquid crystals are respectively formed on inner surfaces of the first substrate SUB1 and the second substrate SUB2 contacting the liquid crystals. A column spacer may be formed between the first substrate SUBS1 and the second substrate SUBS2 to maintain cell gaps of the liquid crystal cells.

The common electrodes are formed on the second substrate SUB2 in a vertical electric field driving manner such as a twisted nematic (TN) mode and a vertical alignment (VA) mode. Further, the common electrodes are formed on the first substrate SUB1 along with the pixel electrodes Px in a horizontal electric field driving manner such as an in-plane switching (IPS) mode and a fringe field switching (FFS) mode. In the embodiment of the invention, the common electrodes in the horizontal electric field driving manner are described as an example.

Referring to FIGS. 4, 5A and 5B, the touch sensor integrated type display device according to one embodiment of the invention includes an active area AA displaying data and a bezel area BA disposed at outside of the active area AA. The active area AA includes touch electrodes formed therein, and the bezel area BA includes wires and a gate driving circuit formed therein.

Referring to FIG. 4, the active area AA of the touch sensor integrated type display device includes a plurality of first touch electrodes Tx11 to Tx14, Tx21 to Tx24, Tx31 to Tx34 and Tx41 to Tx44, a plurality of first sub-routing wires TW11 to TW14, TW21 to TW24, TW31 to TW34, and TW41 to TW44, and a plurality of second touch electrodes Rx1 to Rx3. The plurality of first touch electrodes Tx11 to Tx14, Tx21 to Tx24, Tx31 to Tx34 and Tx41 to Tx44 are divided in a first direction (e.g., x-axis direction) and second direction (e.g., y-axis direction) which are cross to each other. The plurality of first sub-routing wires TW11 to TW14, TW21 to TW24, TW31 to TW34, and TW41 to TW44 are connected to the plurality of first touch electrodes Tx11 to Tx14, Tx21 to Tx24, Tx31 to Tx34 and Tx41 to Tx44, respectively and arranged in the second direction. Each of the plurality of second touch electrodes Rx1 to Rx3 is disposed between first touch electrodes Tx11 to tx41 and Tx12 to Tx42, Tx12 to Tx42 and Tx13 to Tx43, Tx13 to Tx43 and Tx14 to Tx44 neighbored in the first direction to be arranged in the second direction.

The plurality of first touch electrodes Tx11 to Tx14, Tx21 to Tx24, Tx31 to Tx34 and Tx41 to Tx44 are connected to the first connection wires TW1c to TW4c, and a plurality of first main-routing wires TW1 to TW4 through the first sub-routing wires TW11 to TW14, TW21 to TW24, TW31 to TW34, thereby forming a plurality of first touch electrode serials Tx1 to Tx4 arranged in the first direction in the active area AA.

More specifically, 1-1 touch electrodes Tx11 to Tx14 arranged in a first row are connected to each other by the 1-1 sub-routing wires TW11 to TW14 which are connected to the 1-1 touch electrodes Tx11 to Tx14, respectively, a 1-1 connection wire TW1c which connects the 1-1 sub-routing wires TW11 to TW14, and a 1-1 main-routing wire TW1 connected to the 1-1 connection wire TW1c, thereby forming a 1-1 touch electrode serial Tx1.

1-2 touch electrodes Tx21 to Tx24 arranged in a second row are connected to each other by the 1-2 sub-routing wires TW21 to TW24 which are connected to the 1-2 touch electrodes Tx21 to Tx24, respectively, a 1-2 connection wire TW2c which connects 1-2 sub-routing wires TW21 to TW24, and a 1-2 main-routing wire TW2 connected to the 1-2 connection wire TW2c, thereby forming a 1-2 touch electrode serial Tx2.

1-3 touch electrodes Tx31 to Tx34 arranged in a third row are connected to each other by the 1-3 sub-routing wires TW31 to TW34 which are connected to the 1-3 touch electrodes Tx31 to Tx34, respectively, a 1-3 connection wire TW3c which connects 1-3 sub-routing wires TW31 to TW34, and a 1-3 main-routing wire TW3 connected to the 1-3 connection wire TW3c, thereby forming a 1-3 touch electrode serial Tx3.

1-4 touch electrodes Tx41 to Tx44 arranged in a fourth row are connected to each other by the 1-4 sub-routing wires TW41 to TW44 which are connected to the 1-4 touch electrodes Tx41 to Tx44, respectively, a 1-4 connection wire TW4c which connects 1-4 sub-routing wires TW41 to TW44, and a 1-4 main-routing wire TW4 connected to the 1-4 connection wire TW4c, thereby forming a 1-4 touch electrode serial Tx4.

Each of the first touch electrodes Tx11 to Tx14, Tx21 to Tx24, Tx31 to Tx34 and Tx41 to Tx44 has a same size. Also, the first touch electrodes Tx11 to Tx14 disposed at an uppermost of the active area AA are extended from the active area AA to an upper side of the bezel area BA. The first touch electrodes Tx11 to Tx41 disposed at a leftmost of the active area AA are extended from the active area AA to a left side of the bezel area BA. The first touch electrodes Tx14 to Tx44 disposed at a rightmost of the active area AA are extended from the active area AA to a right side of the bezel area BA. The first touch electrodes Tx41 to Tx44 disposed at lowermost of the active area AA are extended from the active area AA to a lower side of the bezel area BA. Accordingly, in the active area AA, each of the first touch electrodes Tx11, Tx12, Tx13, Tx14, Tx21, Tx31, Tx41, Tx24, Tx44, Tx42 and Tx43 disposed at edges of the active area AA has a size less than that of the each of the first touch electrodes Tx22, Tx23, Tx32 and Tx33 disposed at inner side of the active area AA. Also, in the active area AA, each of the first touch electrodes Tx11, Tx14, Tx41, and Tx44 disposed at corners of the active area AA has a size less than that of the each of the first touch electrodes Tx12, Tx13, Tx21, Tx31, Tx24, Tx34, Tx42 and Tx43 disposed at edges of the active area AA.

A 2-1 touch electrode Rx1 of the plurality of second electrodes Rx1 to Rx3 is disposed between 1-5 touch electrodes Tx11 to Tx41 arranged in a first column and 1-6 touch electrodes Tx12 to Tx42 arranged in a second column, thereby forming a 2-1 touch electrode serial Rx1. The 2-1 touch electrode Rx1 is extended from the active area AA to the upper and lower sides of the bezel area BA.

A 2-2 touch electrode Rx2 of the plurality of second electrodes Rx1 to Rx3 is disposed between 1-6 touch electrodes Tx12 to Tx42 arranged in a second column and 1-7 touch electrodes Tx13 to Tx43 arranged in a third column, thereby forming a 2-2 touch electrode serial Rx2. The 2-2 touch electrode Rx2 is extended from the active area AA to the upper and lower sides of the bezel area BA.

A 2-3 touch electrode Rx3 of the plurality of second electrodes Rx1 to Rx3 is disposed between 1-7 touch electrodes Tx13 to Tx43 arranged in a third column and 1-8 touch electrodes Tx14 to Tx44 arranged in a fourth column, thereby forming a 2-3 touch electrode serial Rx3. The 2-3 touch electrode Rx3 is extended from the active area AA to the upper and lower sides of the bezel area BA.

The bezel area BA is disposed at outside of the active area AA, and includes portions of the first touch electrodes Tx11, Tx12, Tx13, Tx14, Tx21, Tx31, Tx41, Tx24, Tx34, Tx44, Tx42 and Tx43 extended from the active area AA to the bezel area BA, portions of the second touch electrodes Rx1 to Rx3, a gate driving circuit GD and wires.

The gate driving circuit GD is formed in a gate in panel (GIP) type in the bezel area BA to drive gate lines of the display device. Detailed description for the gate driving circuit GD and a data driving circuit will be omitted because they are known in the related art.

The wires include the first touch wires TW11 to TW14, TW21 to TW24, TW31 to TW34, TW41 to TW44, TW1c to TW4c, and TW1 to TW4, the second touch wires RW1 to RW3 connected to the second touch electrodes Rx1 to Rx3 as shown in FIG. 4, gate lines G1 and G2 (shown in FIG. 3) connected to the gate driving circuit GD, and data lines D1 and D2 (shown in FIG. 3) connected to a data driving circuit.

At least one of the first touch electrodes Tx14, Tx24, Tx34 and Tx44 extended from the active area AA to the bezel area BA is overlapped with at least a portion of the gate driving circuit GD. If two gate driving circuits (e.g. first and second gate driving circuits) are disposed at both sides (e.g. left and right sides) of the active area AA, at least one of the first touch electrodes Tx11, Tx21, Tx31 and Tx41 extended from the active area AA to the left side of the bezel area BA is overlapped with at least a portion of the first gate driving circuit. Similarly, at least one of the first touch electrodes Tx14, Tx24, Tx34 and Tx44 extended from the active area AA to the right side of the bezel area BA is overlapped with at least a portion of the second gate driving circuit.

The first and second touch electrodes Tx11 to Tx14, Tx21 to Tx24, Tx31 to Tx34, Tx41 to Tx44, and Rx1 to Rx3 disposed in the active area AA and the bezel area BA are formed by dividing a common electrode of the display device. Accordingly, the first and second touch electrodes Tx11 to Tx14, Tx21 to Tx24, Tx31 to Tx34, Tx41 to Tx44, and Rx1 to Rx3 are operated as the common electrode in a display mode and operated as touch electrodes for perceiving touch positions in a touch mode.

Hereinafter, the active area AA and the bezel area BA of the touch sensor integrated type display device will be more specifically described with reference to FIGS. 5A and 5B. FIG. 5A is a cross-sectional view of region R1 shown in FIG. 4, and FIG. 5B is a cross-sectional view of region R2 shown in FIG. 4. The region R2 shows that the first touch electrode Tx44 extended from the active area AA to the bezel area BA is overlapped with the gate driving circuit GD.

Referring to FIGS. 4 and 5A, the region R1 of the touch sensor integrated type display device according to the first embodiment of the invention includes source/drain electrodes SD of thin film transistors formed on a first substrate SUB1, a first passivation layer PASS1 covering the source/drain electrodes SD, first sub-routing wires TW11 to TW14, TW21 to TW24, TW31 to TW34 and TW41 to TW44 formed on the first passivation layer PASS1, pixel electrode Px formed on the first passivation layer PASS1 to be separated from the sub-routing wires TW11 to TW14, TW21 to TW24, TW31 to TW34 and TW41 to TW44, a second passivation layer PASS2 covering the first sub-routing wires TW11 to TW14, TW21 to TW24, TW31 to TW34 and TW41 to TW44 and pixels Px, and first and second touch electrodes Tx11 to Tx14, Tx21 to Tx24, Tx31 to Tx34, Tx41 to Tx44 and Rx1 to Rx3 formed on the second passivation layer PASS 2 to be overlapped with the pixel electrodes Px. The first and second touch electrodes Tx11 to Tx14, Tx21 to Tx24, Tx31 to Tx34, Tx41 to Tx44 and Rx1 to Rx3 also as common electrodes in a display mode.

Referring to FIG. 5B, the region R2 of the touch sensor integrated type display device according to the first embodiment of the invention includes a gate driving circuit GD, 1-8 touch electrodes Tx14 to Tx44 and first sub-routing wires TW14 to TW44 formed on the gate driving circuit GD.

The gate driving circuit GD includes source/drain electrodes SD of a thin film transistor formed on the first substrate SUB1, a first passivation layer PASS1 covering the source/drain electrodes SD, transparent electrodes TE formed on the first passivation layer PASS1. The region R2 includes the first sub-routing wires TW14 to TW44 formed on the transparent electrodes TE, a second passivation layer PASS2 covering the first sub-routing wires TW14 to TW44 and the transparent electrodes, the 1-8 touch electrodes formed on the second passivation layer PASS2 to respectively contact the first sub-routing wires TW14 to TW44 via the contact holes formed in the second passivation layer PASS2. The transparent electrode TE may be omitted in embodiments of the invention.

In the touch sensor integrated type display device according to the first embodiment of the invention, the first touch electrodes Tx11 to Tx14, Tx21, Tx31, Tx41, Tx24, Tx34, Tx44, Tx42, Tx43 disposed at outermost of the active area AA, that is the first touch electrodes respectively disposed at an uppermost, a leftmost, a rightmost and a lowermost of the active area AA are extended from the active area AA to the bezel area BA. Both ends of the second touch electrodes Rx1 to Rx3 are extended to the bezel area BA.

As thus, because the first touch electrodes Tx11 to Tx14, Tx21, Tx31, Tx41, Tx24, Tx34, Tx44, Tx42, Tx43 disposed at outermost of the active area AA and the both ends of the second touch electrodes Rx1 to Rx3 are extended to the bezel area BA, it is possible to increase the change amount of a mutual capacitance between the first touch electrodes Tx11 to Tx14, Tx21, Tx31, Tx41, Tx24, Tx34, Tx44, Tx42, Tx43 disposed at outermost of the active area AA and the second touch electrodes Rx1 to Rx3 though touches are performed at edge areas and corner areas of the active area AA of the touch sensor integrated type display device.

Accordingly, it is possible to prevent touch accuracy and linearity from being deteriorated though touches are performed at edge areas and corner areas of the active area AA of the touch sensor integrated type display device.

A touch sensor integrated type display device according to another example embodiment of the invention is described in detail with reference to FIGS. 3, 6, 7A and 7B. FIG. 3 is a partial exploded perspective view schematically illustrating a touch sensor integrated type display device according to embodiments of the invention, FIG. 6 is a top plan view illustrating a touch sensor integrated type display device according to another embodiment of the invention, FIG. 7A is a cross-sectional view of region R1 shown in FIG. 6, and FIG. 7B is a cross-sectional view of region R3 shown in FIG. 6.

Figure 6:
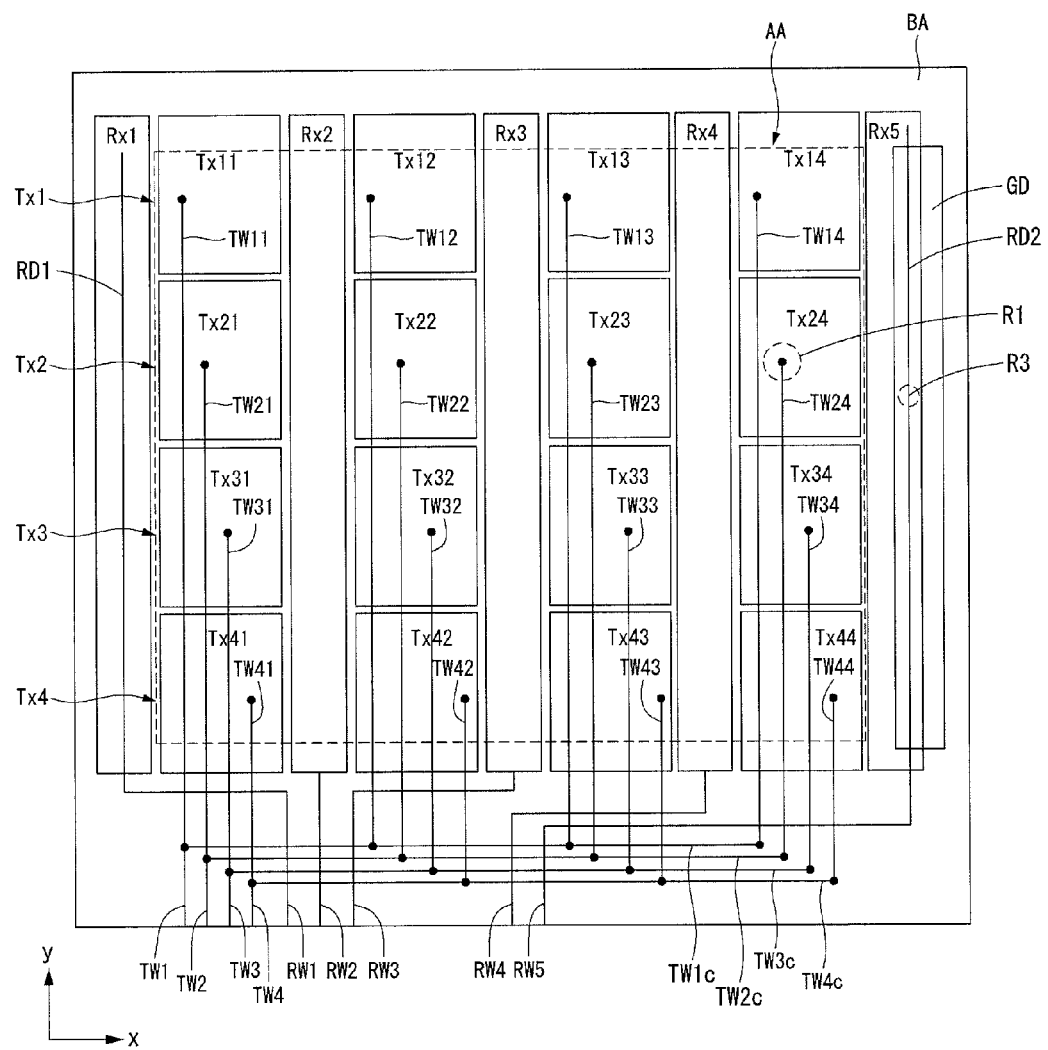
FIG. 6 is a top plan view illustrating a touch sensor integrated type display device according to another embodiment of the invention.
Figure 7A:
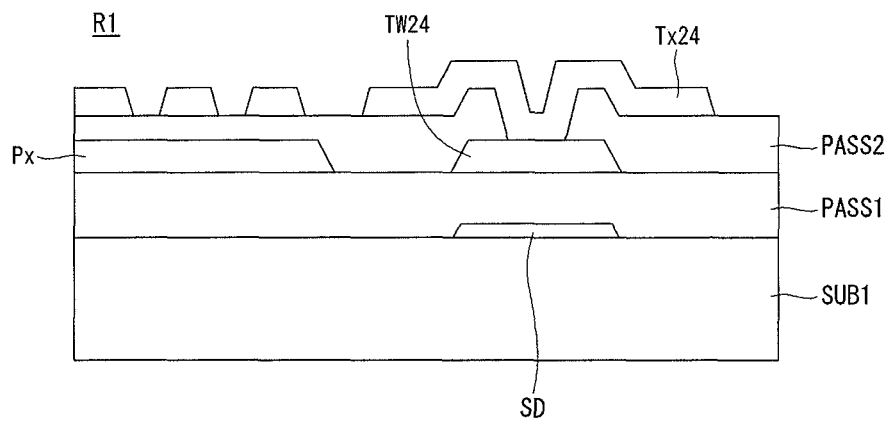
FIG. 7A is a cross-sectional view of region R1 shown in FIG. 6.
Figure 7B:
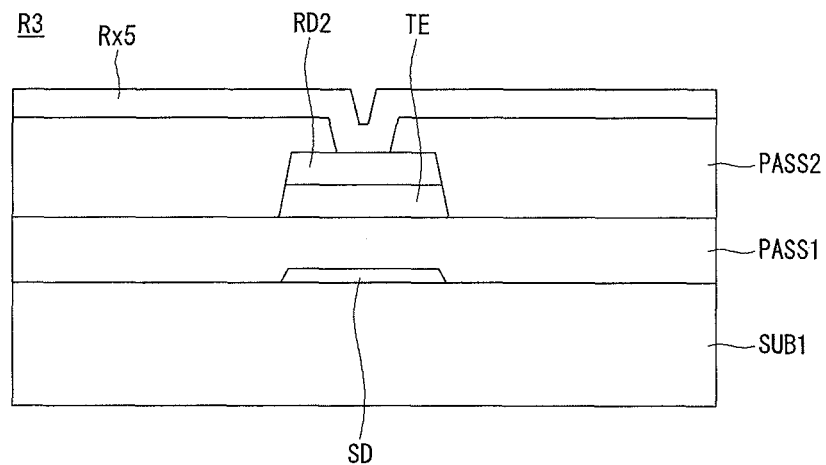
FIG. 7B is a cross-sectional view of region R2 shown in FIG. 6.

Referring to FIGS. 6, 7A and 7B, the touch sensor integrated type display device according to another embodiment of the invention includes an active area AA displaying data and a bezel area BA disposed at outside of the active area AA. The active area AA includes touch electrodes formed therein, and the bezel area BA includes wires and a gate driving circuit formed therein.

Referring to FIG. 6, the active area AA of the touch sensor integrated type display device includes a plurality of first touch electrodes Tx11 to Tx14, Tx21 to Tx24, Tx31 to Tx34 and Tx41 to Tx44, a plurality of first sub-routing wires TW11 to TW14, TW21 to TW24, TW31 to TW34, and TW41 to TW44, and a plurality of second touch electrodes Rx2 to Rx4. The plurality of first touch electrodes Tx11 to Tx14, Tx21 to Tx24, Tx31 to Tx34 and Tx41 to Tx44 are divided in a first direction (e.g., x-axis direction) and second direction (e.g., y-axis direction) which are cross to each other. The plurality of first sub-routing wires TW11 to TW14, TW21 to TW24, TW31 to TW34, and TW41 to TW44 are connected to the plurality of first touch electrodes Tx11 to Tx14, Tx21 to Tx24, Tx31 to Tx34 and Tx41 to Tx44, respectively and arranged in the second direction.

Each of the plurality of second touch electrodes Rx2 to Rx4 is disposed between first touch electrodes Tx11 to Tx41 and Tx12 to Tx42, Tx12 to Tx42 and Tx13 to Tx43, Tx13 to Tx43 and Tx14 to Tx44 neighbored in the first direction to be arranged in the second direction.

The plurality of first touch electrodes Tx11 to Tx14, Tx21 to Tx24, Tx31 to Tx34 and Tx41 to Tx44 are connected to the first connection wires TW1c to TW4c, and a plurality of first main-routing wires TW1 to TW4 through the first sub-routing wires TW11 to TW14, TW21 to TW24, TW31 to TW34, thereby forming a plurality of first touch electrode serials Tx1 to Tx4 arranged in the first direction in the active area AA.

More specifically, 1-1 touch electrodes Tx11 to Tx14 arranged in a first row are connected to each other by the 1-1 sub-routing wires TW11 to TW14 which are connected to the 1-1 touch electrodes Tx11 to Tx14, respectively, a 1-1 connection wire TW1c which connects the 1-1 sub-routing wires TW11 to TW14, and a 1-1 main-routing wire TW1 connected to the 1-1 connection wire TW1c, thereby forming a 1-1 touch electrode serial Tx1.

1-2 touch electrodes Tx21 to Tx24 arranged in a second row are connected to each other by the 1-2 sub-routing wires TW21 to TW24 which are connected to the 1-2 touch electrodes Tx21 to Tx24, respectively, a 1-2 connection wire TW2c which connects 1-2 sub-routing wires TW21 to TW24, and a 1-2 main-routing wire TW2 connected to the 1-2 connection wire TW2c, thereby forming a 1-2 touch electrode serial Tx2.

1-3 touch electrodes Tx31 to Tx34 arranged in a third row are connected to each other by the 1-3 sub-routing wires TW31 to TW34 which are connected to the 1-3 touch electrodes Tx31 to Tx34, respectively, a 1-3 connection wire TW3c which connects 1-3 sub-routing wires TW31 to TW34, and a 1-3 main-routing wire TW3 connected to the 1-3 connection wire TW3c, thereby forming a 1-3 touch electrode serial Tx3.

1-4 touch electrodes Tx41 to Tx44 arranged in a fourth row are connected to each other by the 1-4 sub-routing wires TW41 to TW44 which are connected to the 1-4 touch electrodes Tx41 to Tx44, respectively, a 1-4 connection wire TW4c which connects 1-4 sub-routing wires TW41 to TW44, and a 1-4 main-routing wire TW4 connected to the 1-4 connection wire TW4c, thereby forming a 1-4 touch electrode serial Tx4.

Each of the first touch electrodes Tx11 to Tx14, Tx21 to Tx24, Tx31 to Tx34 and Tx41 to Tx44 has a same size. Also, the first touch electrodes Tx11 to Tx14 disposed at an uppermost of the active area AA are extended from the active area AA to an upper side of the bezel area BA. The first touch electrodes Tx41 to Tx44 disposed at lowermost of the active area AA are extended from the active area AA to a lower side of the bezel area BA. Accordingly, in the active area AA, each of the first touch electrodes Tx11, Tx12, Tx13, Tx14, Tx41, Tx42, Tx43, and Tx44 disposed at upper and lower edges of the active area AA has a size less than that of the each of the first touch electrodes Tx21, Tx22, Tx23, Tx24, Tx31, Tx32, Tx33 and Tx34 disposed at left, right and inner sides of the active area AA.

A 2-2 touch electrode Rx2 of the plurality of second electrodes Rx2 to Rx4 is disposed between 1-5 touch electrodes Tx11 to Tx41 arranged in a first column and 1-6 touch electrodes Tx12 to Tx42 arranged in a second column, thereby forming a 2-2 touch electrode serial Rx1. The 2-2 touch electrode Rx2 is extended from the active area AA to the upper and lower sides of the bezel area BA.

A 2-3 touch electrode Rx3 of the plurality of second electrodes Rx2 to R4 is disposed between 1-6 touch electrodes Tx12 to Tx42 arranged in a second column and 1-7 touch electrodes Tx13 to Tx43 arranged in a third column, thereby forming a 2-3 touch electrode serial Rx3. The 2-3 touch electrode Rx3 is extended from the active area AA to the upper and lower sides of the bezel area BA.

A 2-4 touch electrode Rx4 of the plurality of second electrodes Rx4 to Rx4 is disposed between 1-7 touch electrodes Tx13 to Tx43 arranged in a third column and 1-8 touch electrodes Tx14 to Tx44 arranged in a fourth column, thereby forming a 2-4 touch electrode serial Rx4. The 2-3 touch electrode Rx3 is extended from the active area AA to the upper and lower sides of the bezel area BA.

The bezel area BA is disposed at outside of the active area AA, and includes a 2-1 second electrode Rx1 neighbored to the 1-5 touch electrodes Tx11, Tx21, Tx31 and Tx41 arranged in a leftmost column, a 2-5 second electrode Rx5 neighbored to the 1-5 touch electrodes Tx14, Tx24, Tx34 and Tx44 arranged in a rightmost column, portions of the first touch electrodes Tx11, Tx12, Tx13, Tx14, Tx41, Tx42, Tx43 and Tx44 extended from the active area AA to the bezel area BA, portions of the second touch electrodes Rx2 to Rx4, a gate driving circuit GD and wires. The bezel area BA includes at least one first resistance reducing wire RD1 connected to the 2-1 touch electrode Rx1 to reduce the 2-1 touch electrode Rx1 and at least one second resistance reducing wire RD2 connected to the 2-5 touch electrode Rx5 to reduce the 2-5 touch electrode Rx5.

The gate driving circuit GD is formed in a gate in panel (GIP) type in the bezel area BA to drive gate lines of the display device. Detailed description for the gate driving circuit GD and a data driving circuit will be omitted because they are known in the related art.

The wires include the first touch wires TW11 to TW14, TW21 to TW24, TW31 to TW34, TW41 to TW44, TW1c to TW4c, and TW1 to TW4 connected to the first touch electrodes Tx11 to Tx14, Tx21 to Tx24, Tx31 to Tx34 and Tx41 to Tx44, the second touch wires RW1 to RW5 connected to the second touch electrodes Rx1 to Rx5, as shown in FIG. 6, gate lines G1 and G2 (shown in FIG. 3) connected to the gate driving circuit GD, and data lines D1 and D2 (shown in FIG. 3) connected to a data driving circuit. The 2-1 touch electrode Rx2 of the second touch electrodes Rx1 to Rx5 is connected to the 2-1 main routing wire RW1 via the first resistance reducing wire RD1, and the 2-5 touch electrode Rx5 of the second touch electrodes Rx1 to Rx5 is connected to the 2-5 main routing wire RW5 via the second resistance reducing wire RD2.

The 2-5 touch electrode Rx5 disposed at outside of the active area AA is overlapped with at least a portion of the gate driving circuit GD. If two gate driving circuits (e.g. first and second gate driving circuits) are disposed at both sides (e.g. left and right sides) of the active area AA, the 2-1 touch electrode Rx1 disposed at a left side of the active area AA is overlapped with at least a portion of the first gate driving circuit. Similarly, the 2-5 touch electrode 5 disposed at a right side of the active area AA is overlapped with at least a portion of the second gate driving circuit.

The first and second touch electrodes Tx11 to Tx14, Tx21 to Tx24, Tx31 to Tx34, Tx41 to Tx44, and Rx2 to Rx4 disposed in the active area AA and the bezel area BA are formed by dividing a common electrode of the display device. Accordingly, the first and second touch electrodes Tx11 to Tx14, Tx21 to Tx24, Tx31 to Tx34, Tx41 to Tx44, and Rx2 to Rx4 are operated as the common electrode in a display mode and operated as touch electrodes for perceiving touch positions in a touch mode. But the 2-1 and 2-5 touch electrodes Rx1 and Rx5 do not need to operate as the common electrode in a display mode because they are disposed in a bezel area BA. Accordingly, the 2-1 and 2-5 touch electrodes Rx1 and Rx5 are operated as the second touch electrodes.

Hereinafter, the active area AA and the bezel area BA of the touch sensor integrated type display device will be more specifically described with reference to FIGS. 7A and 7B. FIG. 7A is a cross-sectional view of region R1 shown in FIG. 6, and FIG. 7B is a cross-sectional view of region R3 shown in FIG. 6. The region R3 shows that the 2-5 touch electrode Rx5 disposed at a right side of the bezel area BA is overlapped with the gate driving circuit GD.

Referring to FIGS. 6 and 7A, the region R1 of the touch sensor integrated type display device according to the another embodiment of the invention includes source/drain electrodes SD of thin film transistors formed on a first substrate SUB1, a first passivation layer PASS1 covering the source/drain electrodes SD, first sub-routing wires TW11 to TW14, TW21 to TW24, TW31 to TW34 and TW41 to TW44 formed on the first passivation layer PASS1, pixel electrode Px formed on the first passivation layer PASS1 to be separated from the sub-routing wires TW11 to TW14, TW21 to TW24, TW31 to TW34 and TW41 to TW44, a second passivation layer PASS2 covering the first sub-routing wires TW11 to TW14, TW21 to TW24, TW31 to TW34 and TW41 to TW44 and pixels Px, and first and second touch electrodes Tx11 to Tx14, Tx21 to Tx24, Tx31 to Tx34, Tx41 to Tx44 and Rx2 to Rx4 formed on the second passivation layer PASS 2 to be overlapped with the pixel electrodes Px. The first and second touch electrodes Tx11 to Tx14, Tx21 to Tx24, Tx31 to Tx34, Tx41 to Tx44 and Rx2 to Rx4 also as common electrodes in a display mode.

Referring to FIG. 7B, the region R3 of the touch sensor integrated type display device according to the another embodiment of the invention includes a gate driving circuit GD, 2-5 touch electrode Rx5 and the second resistance reducing wire RD2 formed on the gate driving circuit GD.

The gate driving circuit GD includes source/drain electrodes SD of a thin film transistor formed on the first substrate SUB1, a first passivation layer PASS1 covering the source/drain electrodes SD, and a transparent electrode TE formed on the first passivation layer PASS1. The region R3 includes a second resistance reducing wire RD2 formed on the transparent electrode TE, a second passivation layer PASS2 covering the second resistance reducing wire RD2 and the transparent electrode TE, the 2-5 touch electrode formed on the second passivation layer PASS2 to contact the second resistance reducing wire RD2 via the contact hole formed in the second passivation layer PASS2. The transparent electrode TE may be omitted in embodiments of the invention.

In the touch sensor integrated type display device according to the another embodiment of the invention, the first touch electrodes Tx11 to Tx14, Tx21, Tx31, Tx41, Tx41, Tx42, Tx43, and Tx44 disposed at the uppermost and the lowermost of the active area AA are extended from the active area AA to the bezel area BA. Both ends of the second touch electrodes Rx2 to Rx4 are extended to the bezel area BA. Also, the second touch electrodes R1 and R5 are disposed in the bezel area BA.

As thus, because the first touch electrodes Tx11 to Tx14 and Tx41 to Tx44 disposed at an uppermost side of the active area AA, the first touch electrodes Tx41 to Tx44 disposed at lowermost side of the active area AA, and the both ends of the second touch electrodes Rx2 to Rx4 are extended to the bezel area BA, and the second touch electrodes R1 and R5 are disposed in the bezel area BA, it is possible to increase the change amount of a mutual capacitance between the first touch electrodes Tx11 to Tx14 and Tx41 to Tx44 disposed at the uppermost and the lowermost of the active area AA and the second touch electrodes Rx1 to Rx5 though touches are performed at edge areas and corner areas of the active area AA of the touch sensor integrated type display device. In particular, because the second touch electrodes Rx1 and Rx5 for sensing the touches are disposed to be overlapped with the gate driving circuit GD having a GIP type in the bezel area BA, it is possible to use the mutual capacitance between the first touch electrodes Tx11, Tx21, Tx31, Tx41 and the second touch electrode Rx1 and the mutual capacitance between first touch electrodes Tx14, Tx24, Tx34, Tx44 and the second touch electrode Rx5.

Accordingly, it is possible to prevent touch accuracy and linearity from being deteriorated though touches are performed at edge areas and corner areas of the active area AA of the touch sensor integrated type display device.

In the touch sensor integrated type display devices according to the embodiments of the invention, the wires TW11 to TW14, TW21 to TW24, TW31 to TW34, TW41 to TW44, TW1c to TW4c, TW1 to TW4, RD1 and RD2 are made from metal material including Al, AlNd, Mo, MoTi, Cu, Cr, Ag, Ag and Ag-based alloy, and the first and second touch electrodes are made from transparent conductive material including indium tin oxide (ITO), indium zinc oxide (GZO) and gallium-doped zinc oxide (GZO). Other materials are usable with the wires and electrodes of the embodiments of the invention.

Although particular embodiments of the invention have been illustrated and described, it will be apparent to those skilled in the art that various changes and modifications can be made without departing from the spirit of the invention.

For example, in the above description with reference to FIGS. 3 to 7B, the touch sensor integrated type display devices are applied to a liquid crystal display device. Herein, it should be understood that the display devices include liquid crystal display devices (LCD), electroluminescence display devices such as organic light emitting diode display device (OLED), field emission display devices (FED), plasma display panels (PDP), and electrophoresis display devices. Also, numbers of the touch electrodes and wires and arrangement thereof are selected for clarity. Therefore the invention is not limited to examples described in the embodiments Accordingly, the technical scope of the present invention is not limited to the detailed description of the present invention, but should be defined by the appended claims.

What is claimed is:

1. A touch sensor integrated type display device having an active area displaying data, and a bezel area disposed at outside of the active area and including a gate in panel (GIP) type gate driving circuit, the display device comprising:
 a plurality of first electrodes each having a first size, and arranged in the active area in a first direction and a second direction which cross each other, the plurality of first electrodes being separated from each other; and
 a plurality of second electrodes arranged in the active area in the second direction and alternately disposed between immediately adjacent pairs of the plurality of first electrodes arranged along the second direction,
 wherein the plurality of first electrodes include a plurality of first outer electrodes that are disposed at an outermost area of the active area, and each of the plurality of first outer electrodes has a portion that is extended into the bezel area,
 wherein each of the plurality of first outer electrodes disposed at edges of the active area has a second size in the active area, and each of the plurality of first outer electrodes disposed at corners of the active area has a third size in the active area,
 wherein the third size is smaller than the second size which is smaller than the first size,
 wherein portions of the plurality of first outer electrodes extended into the bezel area are overlapped with the GIP type gate driving circuit in the bezel area,
 wherein the plurality of first and second electrodes are disposed on a same layer, operated as a common electrode in a display mode for displaying the data and operated as touch electrodes in a touch mode for perceiving touch positions, and
 wherein a routing wire connected to any one of the first electrodes in the bezel area is overlapped with a source/drain electrode of the GIP type gate driving circuit.

2. The display device of claim 1, wherein at least one of the plurality of second electrodes has a portion that is extended into the bezel area.

3. The display device of claim 2, wherein the plurality of first outer electrodes include a plurality of first corner electrodes disposed at corner areas of the active area, and each of the plurality of first corner electrodes has portions that are extended into the bezel area along the first and second directions, and
 each of the plurality of second electrodes has a portion that is extended into the bezel area along the second direction.

4. The display device of claim 3, wherein the plurality of first outer electrodes include a plurality of first edge electrodes disposed at upper and lower edge areas of the active area, and each of the plurality of first edge electrodes has a portion that is extended into the bezel area along the second direction, and
 the plurality of first outer electrodes include a plurality of second edge electrodes disposed at left and right edge areas of the active area, and each of the plurality of second edge electrodes has a portion that is extended into the bezel area along the first direction.

5. The display device of claim 3, further comprising:
 a plurality of first sub-routing wires respectively connected to a plurality of first touch electrodes, and arranged in the second direction to be extended into the bezel area;
 first connection wires respectively connected to the plurality of sub-routing wires in the bezel area to form a plurality of first electrode serials extending in the first direction; and
 a plurality of second sub-routing wires respectively connected to the plurality of second electrodes in the bezel area.

6. A touch sensor integrated type display device having an active area displaying data and a bezel area disposed at outside of the active area and including a gate in panel (GIP) type gate driving circuit, the display device comprising:
 a plurality of first electrodes each having a first size, and arranged in the active area in a first direction and a second direction which cross each other, the plurality of first electrodes being separated from each other;
 a plurality of second electrodes arranged in the active area in the second direction and alternately disposed between immediately adjacent pairs of the plurality of first electrodes arranged along the second direction; and at least one third electrode disposed at the bezel area, and arranged along one side of the active area, wherein each of the at least one third electrode disposed at edges of the active area has a second size in the active area, and each of the at least one third electrode disposed at corners of the active area has a third size in the active area, wherein the third size is smaller than the second size which is smaller than the first size, wherein the at least one third electrode is overlapped with the GIP type gate driving circuit in the bezel area, wherein the plurality of first and second electrodes are disposed on a same layer, operated as a common electrode in a display mode for displaying the data and operated as touch electrodes in a touch mode for perceiving touch positions, and wherein a resistance reducing wire connected to any one of the first electrodes in the bezel area is overlapped with a source/drain electrode of the GIP type gate driving circuit.

7. The display device of claim 6, wherein the first electrodes disposed at upper and lower edge areas of the active area among the plurality of first electrodes are extended into the bezel area along the second direction, and each of the plurality of second electrodes is extended into the bezel area along the second direction.

8. The display device of claim 7, further comprising:

at least one resistance reducing wire connected to the at least one third electrode to reduce a resistance of the at least one third electrode.

9. The display device of claim 8, wherein the at least one resistance reducing wire is formed on a transparent electrode of the GIP type gate driving circuit, and the at least one third electrode is connected to the at least one resistance reducing wire via a contact hole formed in a passivation layer covering the transparent electrode and the at least one resistance reducing wire.

10. A touch sensor integrated type display device having an active area displaying data and a bezel area, the bezel area being disposed on peripheries of the active area, the display device comprising:

a plurality of first electrodes each having a first size, and arranged in a first direction and a second direction which cross each other, the plurality of first electrodes being separated from each other;

a plurality of second electrodes arranged in the active area in the second direction and alternately disposed between immediately adjacent pairs of the plurality of first electrodes arranged along the second direction; and a gate in panel (GIP) type gate driving circuit;

wherein the plurality of the first electrodes and the plurality of second electrodes are arranged to define a rectangular configuration of the active area, and the bezel area is disposed at the periphery of the active area, wherein the plurality of first electrodes include a plurality of first outer electrodes that are disposed at an outermost area of the active area, and the plurality of first outer electrodes each has a portion that is extended into the bezel area, wherein each of the plurality of first outer electrodes disposed at edges of the active area has a second size in the active area, and each of the plurality of first outer electrodes disposed at corners of the active area has a third size in the active area, wherein the third size is smaller than the second size which is smaller than the first size, wherein the plurality of second electrodes each has opposite ends that are extended into the bezel area, wherein the GIP type gate driving circuit is entirely disposed in the bezel area, and at least one of the plurality of first outer electrodes and a plurality of second edge electrodes disposed at edge areas of the active area are overlapped with the GIP type gate driving circuit in the bezel area, wherein the plurality of first and second electrodes are disposed on a same layer, operated as a common electrode in a display mode for displaying the data and operated as touch electrodes in a touch mode for perceiving touch positions, and wherein a routing wire connected to the at least one of the plurality of first outer electrodes and the plurality of second edge electrodes disposed at edge areas of the active area is overlapped with a source/drain electrode of the GIP type gate driving circuit.

11. The display device of claim 10, wherein portions of the at least one of the plurality of first outer electrodes and the plurality of second edge electrodes that extend into the bezel area are overlapped with the GIP type gate driving circuit.

12. The display device of claim 1, wherein the routing wire in the bezel area is connected to a transparent electrode above the source/drain electrode.

13. The display device of claim 6, wherein the resistance reducing wire is connected to a transparent electrode above the source/drain electrode.

14. The display device of claim 10, wherein the routing wire in the bezel area is connected to a transparent electrode above the source/drain electrode.

* * * * *